United States Patent [19]

Christian

[11] Patent Number: 4,625,820
[45] Date of Patent: Dec. 2, 1986

[54] CRAWLER FRAME TO BASE FRAME CONNECTION

[75] Inventor: Damon N. Christian, Dothan, Ala.

[73] Assignee: Kidde, Inc., Saddle Brook, N.J.

[21] Appl. No.: 721,430

[22] Filed: Apr. 9, 1985

[51] Int. Cl.[4] ............................................. B62D 55/10
[52] U.S. Cl. .................................. 180/9.1; 180/9.48; 403/408.1
[58] Field of Search .................. 180/9.1, 9.48, 9.26, 180/9.52, 9.42, 9.21; 403/408.1, 409.1, 388

[56] References Cited

U.S. PATENT DOCUMENTS

| | | | |
|---|---|---|---|
| 2,584,410 | 2/1952 | Abney | 403/409.1 |
| 3,929,204 | 12/1975 | Newell | 180/9.26 |
| 4,014,400 | 3/1977 | Cline | 180/9.1 |
| 4,195,740 | 4/1980 | Beduhn | 180/9.1 |
| 4,433,885 | 2/1984 | Baker | 403/408.1 |
| 4,469,186 | 9/1984 | Goodwine | 180/9.48 |

Primary Examiner—John J. Love
Assistant Examiner—Mark C. Dukes
Attorney, Agent, or Firm—Brady, O'Boyle & Gates

[57] ABSTRACT

Interfitting connector plates on the base and crawler track frames of a crane or other heavy equipment are notched and apertured near their tops and bottoms to receive at least at one of these locations tapering wedge pins having multiple flat faces to engage complementary faces of the notches and apertures of the interfitting connector plates. The notches and apertures at the second location may receive straight pins or tapering wedge pins to complete the connection. The connection is very secure and tight as well as resistant to wear under the heavy pounding to which it is subjected. Easy and rapid assembly without special tools is enabled.

18 Claims, 11 Drawing Figures

CRAWLER FRAME TO BASE FRAME CONNECTION

BACKGROUND OF THE INVENTION

The present invention has for one of its objectives to improve on the crawler to base frame connection forming the subject matter of U.S. Pat. No. 4,469,186, Goodwine. The connection in the patent involves the use of circular cross section pins arranged within circular openings and notches of interfitting connector plates on two frame components. In the case of a large crawler crane of the type shown in the prior patent, the pin connection is subjected during use to heavy loading and pounding on an almost constant basis. The connector pins are never tightly fitted into the openings and notches of the connector plates but are rather loosely placed. There is no wedging or other tight binding engagement between the pins and the plates which they connect. As a result, the connection is less than satisfactory and causes recurrent maintenance problems, hence giving rise to a rather urgent need for a connection which does not possess the above drawbacks. The present invention seeks to satisfy this need in a simple, economical and convenient manner.

Among the improvement features which the present invention embodies are:

(1) A very rigid high strength clearance-free connection.

(2) A connection which is capable of carrying extremely high loadings through moderately sized elements.

(3) A connection whose elements do not require close or expensive machine tolerances.

(4) A connection which can easily be adjusted.

(5) A connection which utilizes the tight wedging action of tapered multi-faceted wedging elements or pins in conjunction with multi-faceted openings and notches formed in frame component connector plates.

(6) A connection which can be effectively tightened with rather low activating forces and can indeed be made self-locking.

(7) A connection which can tolerate wear in its constituent parts without losing its clamping efficiency.

(8) A connection which enables easy and rapid assembly and disassembly of its components without special tools.

Other objects and advantages of the invention will become apparent to those skilled in the art during the course of the following description.

BRIEF DESCRIPTION OF THE DRAWINGS

FIG. 1 is a fragmentary plan view showing a connection according to the present invention between the base frame and crawler frame of a construction crane or the like.

DETAILED DESCRIPTION

Figure 1:
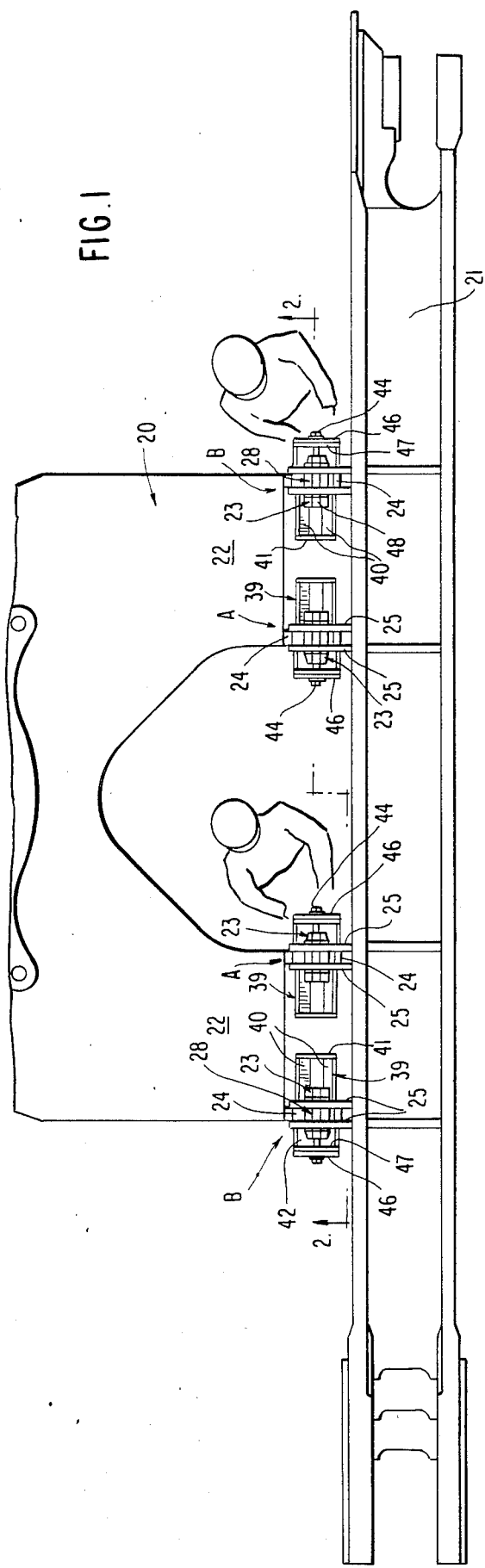

Referring to the drawings in detail wherein like numerals designate like parts, a horizontal base frame 20 and one side crawler frame 21 for a construction crane of the type shown in U.S. Pat. No. 4,469,186 is depicted in FIG. 1. It will of course be understood that another crawler frame 21, not shown, is provided at the opposite side of the base frame 20. The subject matter of this invention relates to a connection for the two frames 20 and 21, and it will be understood that the identical connection exists at the other side of the base frame 20, not shown. A description of the connection on one side of the machine serves to describe the identical connection on the other side.

Figure 2:
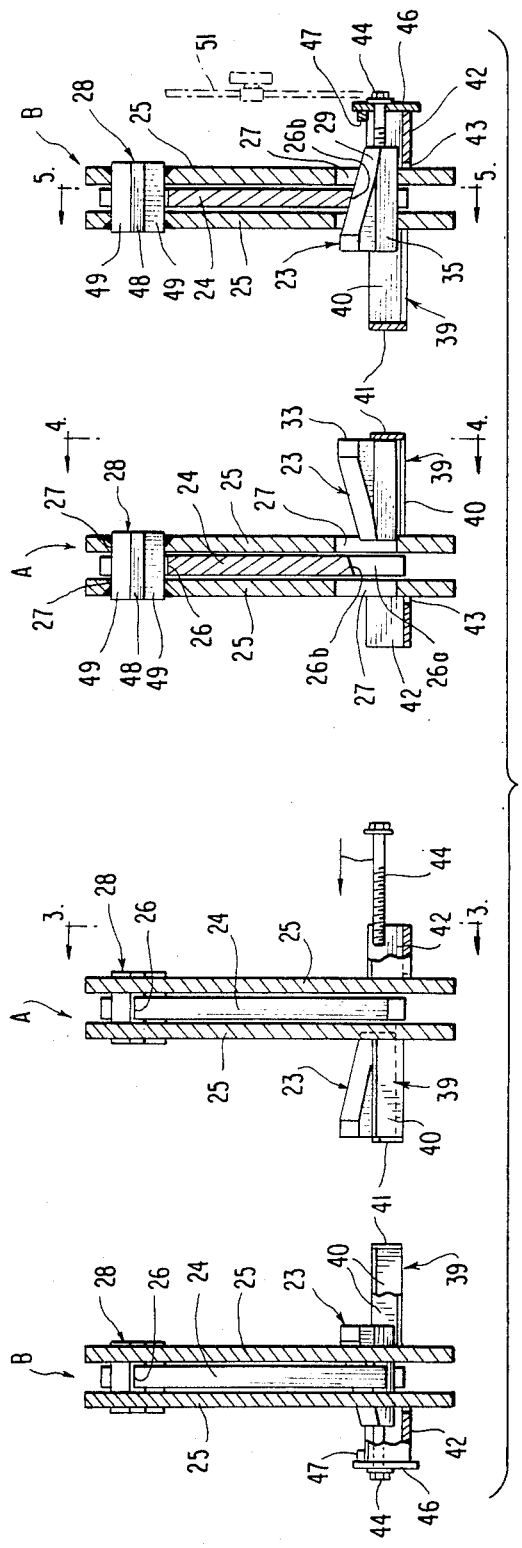
FIG. 2 is an enlarged vertical section taken on line 2—2 of FIG. 1 and modified to show a sequence of operations in the completion of the connection.

The complete connection between the base frame 20 and crawler frame 21, FIGS. 1 and 2, involves four separate structurally identical assemblies or units arranged in two pairs adjacent to spaced transverse extensions 22 of the base frame 20. With respect to FIGS. 1 and 2, it can be noted that wedge pin elements 23 of the two inside connector assemblies A taper inwardly or toward each other endwise, and, as will be fully described, are installed inwardly or toward the longitudinal center of crawler frame 21. The wedge pins 23 of the two outside connector assemblies B are installed in the opposite direction, namely, away from the center of the frame 21 with their tapered ends directed toward the ends of the frame 21.

Each connector assembly or unit comprises an intermediate flat plate 24 attached to the base frame 20 and a pair of flat connector plates 25 which closely straddle the plate 24 in parallel relationship thereto, the three plates being vertically disposed. The plates 25 are attached fixedly to the interior side of the crawler frame 21, FIG. 1.

Figure 5:
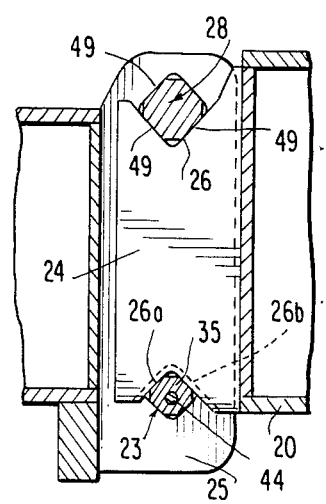
FIG. 5 is a similar section taken on line 5—5 of FIG. 2.

Each intermediate connector plate 24, as best shown in FIG. 5, has a preferably 90° V-notch 26 formed in its top edge and a similar V-notch 26a formed in its bottom edge. As shown in FIG. 2, the surface of the V-notch 26a is inclined, beveled or chamfered, as indicated at 26b in the drawings. This chamfering is not required and is not present on the upper V-notches 26.

Figure 3:
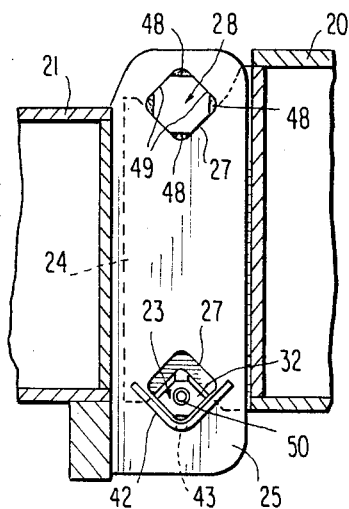
FIG. 3 is a fragmentary vertical section taken on line 3—3 of FIG. 2.
Figure 4:
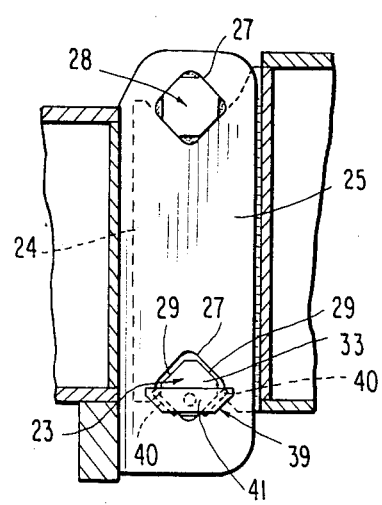
FIG. 4 is a similar section taken on line 4—4 of FIG. 2.

The straddling connector plates 25 of crawler frame 21, FIGS. 3 and 4, have substantially square through openings 27 near their tops and bottoms adapted for registration with the V-notches 26 and 26a in the connection.

The previously-identified tapered wedge pin 23 is employed at the bottom of each connector assembly A and B, whereas straight multi-faceted connector pins 28 are employed at the tops of the assemblies A and B, as will be further described. It should be understood that in some cases tapered or wedge pins may be utilized at the top and bottom of each assembly A and B or at the top instead of the bottom of each assembly, in which case a straight connector pin will be employed at the bottom of each assembly. It is essential, however, that at least one tapered pin 23 be employed in each assembly A and B of the connection between the frames 20 and 21.

Figure 6:
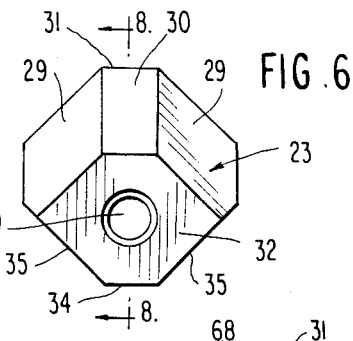
FIG. 6 is an end elevation of a tapered wedge connector pin employed in the invention.

In the illustrated embodiment of the invention the tapered pin 23 or wedge is elongated and is tapered toward one end only. It has one upper pair of opposite side flat faces 29 which converge upwardly symmetrically as shown in FIG. 6 and are parallel to the longitudinal axis of the pin 23. Between the flat faces 29 a single relatively narrow topmost flat face 30 slopes downwardly from the top rear flat face 31 of the pin 23 toward its leading relatively narrow vertical end face 32. The inclined face 30 thus imparts a required taper to the pin or wedge 23. While the illustrated pin 23 has a single tapering surface, in some cases a double tapered pin or wedge, not shown, can be utilized with substantially the same desired results.

Figure 9:
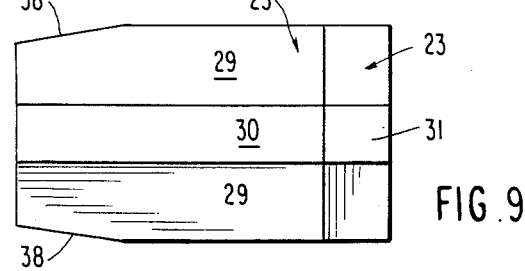
FIG. 9 is a plan view of the wedge pin.

The pin 23 has a rear flat vertical end face 33 parallel to the end face 32 and further includes a narrow bottom longitudinal flat face 34 opposite to the similar face 30, and being bounded on opposite sides by two downwardly convergent flat faces 35 which are symmetrical and which extend entirely between the end faces 32 and 33. On its opposite sides, the pin 23 further includes flat faces 36 of the shape shown in FIG. 7 which lie between the faces 29 and 35 and terminate at a point 37 rearwardly of the forward end face 32. As shown in FIG. 9, the opposite sides of the pin 23 near its forward end are slightly convergent as at 38 to assist in guiding the pin or wedge into its operative position with the plates 24 and 25.

The pin 23 is designed to provide a high degree of wedging frictional engagement with the plates 24 and 25 through their respective notches and openings. In essence, the pin is of modified square cross-section, FIGS. 3 to 5, in that its four corners are removed and corner flat surfaces are provided. When the pin or wedge is placed through the openings 27 and notches 26a in a manner soon to be described, the total engagement of the pin 23 with the plates 24 and 25 is through its upper and lower inclined faces 29 and 35, and no other surfaces of the pin contact the openings 27 and V-notches 26a.

Each connector assembly A and B further comprises a V-trough 39 on the exterior side of one connector plate 25 and being horizontal and being welded to the plate 25 in registration with the adjacent opening 27. The trough 39 includes opposite side spaced plates 40 defining a lower corner gap or slot between them to receive the lower corner of the pin 23, FIG. 4. The trough 39 includes a vertical end retainer wall 41 for the pin placed therein. The V-trough 39 cradles the pin 23 and positions it in registration with the openings 27 and notch 26a. With the rear end face 33 of the pin abutting the retainer wall 41, the leading end of the pin is partially engaged within the adjacent opening 27 as depicted in FIG. 2, right side assembly A.

On the outer face of the opposite side connector plate 25, FIG. 3, a bent horizontal one-piece V-trough 42 defining a 90° angle is welded to the adjacent plate 25 in alignment with the trough 39 and in registration with the adjacent plate opening 27. The bottom of the trough 42 has a drain opening 43 formed therethrough.

Figure 8:
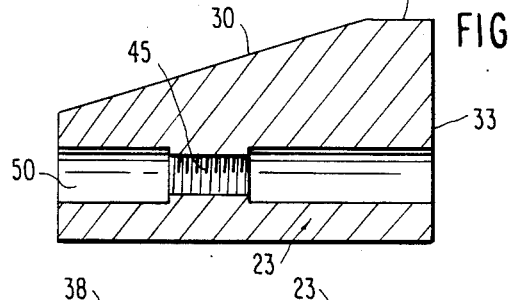
FIG. 8 is a longitudinal vertical section through the wedge pin taken on line 8—8 of FIG. 6.

The one-piece V-trough 42 does not lend support to the pin 23 when the latter is in place and its walls are spaced slightly from the faces 35 of the pin 23, as best shown in FIG. 3. The function of the trough 42 is to resist a pulling force exerted on the pin or wedge 23 during its installation by a pulling bolt 44 having engagement with a threaded internal bore 45 of the pin 23, FIG. 8. A puller or reaction plate 46 bears against the outer end of the trough 42 and is apertured to receive the shank of pulling bolt 44 so that the head of the bolt 44 can bear on the outer face of plate 46. A support lug 47 is welded thereto and bridges and rests upon the top edges of the V-trough 42.

The straight pin 28 shown at the top of each connector assembly A and B is also of square cross-section with its corners removed so as to form corner flats 48 on the straight pins 28. The straight pins have upper and lower pairs of convergent flat faces 49 which engage the edges of the openings 27 near the tops of plates 25 and engage the V-notches 26 of plates 24. These are the only engaging surfaces between the straight pins 28 and the interfitting connector plates 24 and 25. The straight pins 28 are welded to the two plates 25 of each assembly A and B of the connection, as shown in FIG. 2.

In the assembly or making of the connection between the two frames 20 and 21, the straight pins 28 are placed through the openings 27 near the tops of plates 25 and welded to these plates. The two frames 20 and 21 are positioned so that the three plates 24 and 25 of each connector assembly A and B interfit as shown. The pins or wedges 23 are placed on the support troughs 39 with their rear end faces 33 engaging the retainer walls 41 and their leading tapered ends partially engaged through the adjacent openings 27, as explained previously. At this time, before installation of the reaction plate 46 on each trough 42, the pulling bolt 44 is employed as a "fishing" tool to reach through a forward cavity 50, FIG. 8, of each pin 23 and engage the threaded bore 45. After this engagement is made, the pulling bolt 44 is utilized to pull each pin 23 through the openings 27 and V-notch 26a near the bottoms of plates 24 and 25. The surfaces 29 of the tapered pin or wedge will make contact with the chamfered edge 26b of each plate 24, which edge matches the taper angle of the pin 23. Following this, the reaction plate 46 is installed on each trough 42 and a torque wrench 51 shown in phantom lines in FIG. 2 is utilized by a worker to tighten the pulling bolt 44 of each connector assembly A and B until the pins 23 are completely installed.

When completely installed, the pins 23 through engagement with the chamfered edges 26b will effectively force the plates 24 upwardly relative to the plates 25 causing the upper V-notches 26 to tightly engage the lower surfaces 49 of straight pins 28. Simultaneously, the lower surfaces 35 of the pins 23 will tightly engage the adjacent inclined edges of lower openings 27 in plates 25 while the upper surfaces 29 of the pins are tightly engaging the chamfered edges 26b of V-notches 26a in plates 24.

A very secure, easily adjustable, clearance-free connection is established between the frames 20 and 21 which can resist the heavy forces and pounding to which the connection is subjected. The connecting elements are relatively inexpensive to manufacture and rather large tolerances are acceptable. The connection possesses all of the advantages previously enumerated.

Another feature of the invention is its safety during assembling or disassembling. Workers as depicted in FIG. 1 are never required to go beneath the frames being connected and never need place their hands or other parts of their bodies between the frames 20 and 21.

Figure 10:
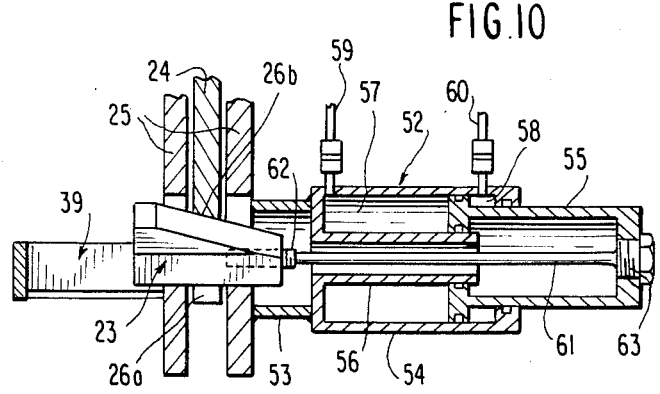
FIG. 10 is a cross sectional view of a connection in accordance with a modification of the invention.

In lieu of using a wrench to pull the pins 23 into place, a power means such as that shown in FIG. 10 can be employed. A double-acting hollow core power cylinder 52 of the type shown in FIG. 10 can be utilized to pull the pins or wedges 23 into place and to push the pins out of engagement with the connector plates 24 and 25 at proper times. The double-acting cylinder 52 is attached to one plate 25 by a spacing sleeve 53 which is welded to the plate 25 and to the cylinder body 54. An extendable and retractable piston body 55 is telescopically engaged with the cylinder body 54 and a hollow core sleeve 56 thereof. Two internal fluid chambers 57 and 58 receive and exhaust pressurized fluid through lines 59 and 60. A rod 61 is threadedly engaged at its leading end 62 with the threaded bore 45 of pin 23. The rod 61 is also threadedly engaged by a screw-threaded portion 63 with the end wall of piston body 55. The screw-threads 62 and 63 have the same pitch.

The resulting connection of the frames 20 and 21 established by the power means in FIG. 10 possesses the same features and advantages possessed by the manually established connection shown in FIGS. 1 through 9 of the drawings.

Figure 11:
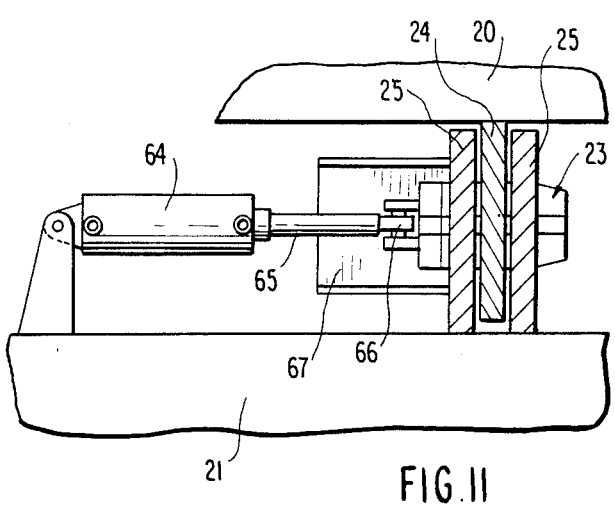
FIG. 11 is a plan view of a connection in accordance with another modification.

FIG. 11 shows an alternate form of the power means for installing and removing the tapered pins 23. This means comprises a conventional double-acting power cylinder 64 of the type shown in U.S. Pat. No. 4,469,186. The rod 65 of cylinder 64 is connected as at 66 with the rear end of each tapered pin 23 to push the pin into solid connecting engagement with the interfitting plates 24 and 25, as previously described. An optional guide trough 67 for the pin 23 is attached to one plate 25 by welding, as shown in FIG. 11.

In the arrangements shown in FIGS. 10 and 11, the cylinders may be powered from the hydraulic system of the frame or, in some cases, by a separate hydraulic system having a hand pump.

While the drawings and description define the straight pins 28 and tapered pins or wedges 23 as possessing generally square cross sections so that the surfaces 29, 35 and 49 define 90° angles, in some cases, this angle may be increased or decreased. The same is true for the angles of the plate openings 27 and plate notches 26 and 26a. For example, if the main loading force is along an axis between the pins 23 and 28, it would be advantageous to make the above angles somewhat greater than 90°. If the main loading force is perpendicular to an axis between the pins 23 and 28, the above angles should be somewhat less than 90°. If the loading force varies in its direction, 90° is thought to be an optimum angle for the engaging faces of the pins and for the edges of the openings 27 and V-notches 26 and 26a.

Figure 7:
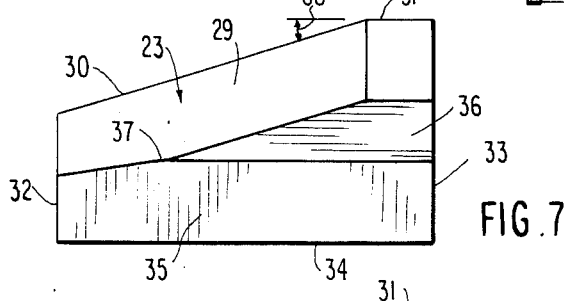
FIG. 7 is a side elevation thereof.

Furthermore, the pin taper angle or wedge angle 68, FIG. 7, can be varied somewhat to produce varying degrees of locking or holding force in the connection. If the angle 68 is small enough, the pin or wedge becomes self-locking.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a crawler frame to base frame connection, a plurality of connector plates fixed to a crawler frame and base frame and being disposed side-by-side in interfitting parallel relationship, the connector plates fixed to one frame having aligned polygonal through openings and at least a connector plate of the other frame having a notch formed therein including substantially right angularly spaced edges in substantial alignment with corresponding edges of the polygonal through openings, a tapered polygonal cross-section wedge adapted to be placed in said through openings and notch, said tapered polygonal cross-section wedge having opposite side pairs of convergent flat faces for engaging opposing corresponding edges of the through openings and notch, said angularly spaced edges of said notch being chamfered at an angle matching the taper of one of the opposite side pairs of convergent flat faces of said wedge, power means to force the wedge to a positive locking position of engagement with the through openings and notch, and means fixedly connecting said plates of one frame at another location thereon with said plate of the other frame being shiftably disposed relative to said means and plates of said one frame, whereby the wedge in said positive locking position forces said plate of said other frame into rigidly locked engagement with said means.

2. In a crawler frame to base frame connection as defined in claim 1, and a holding and positioning trough for said wedge fixed to one connector plate of said one frame with a forward end portion of the wedge partially within the through opening of such connector plate.

3. In a crawler frame to base frame connection as defined in claim 2, and said trough having a rear end wedge positioning wall fixedly connected thereto and engaging a rear end face of the wedge.

4. In a crawler frame to base frame connection as defined in claim 3, and a member fixed to the other connector plate of said one frame in substantial alignment with said holding and positioning trough and having a passage, a pulling element for the wedge and being connectable thereto, and a reaction plate on said member and being connected with said pulling element, said pulling element comprising a part of the power means.

5. In a crawler frame to base frame connection as defined in claim 4, and the pulling element comprising a bolt, said wedge having a threaded opening receiving said bolt.

6. In a crawler frame to base frame connection as defined in claim 1, and said plurality of connector plates comprising a pair of spaced connector plates on one frame in close straddling relationship to a single connector plate on the other frame, said through openings being formed in said pair of straddling connector plates and said notch being formed in said single connector plate.

7. In a crawler frame to base frame connection as defined in claim 1, and said connection including a plurality of spaced connector assemblies each including said connector plates, said wedge, said power means and said means.

8. In a crawler frame to base frame connection as defined in claim 7, and said spaced connector assemblies including two outside and two inside assemblies, and the wedges of the two inside assemblies tapering toward each other, the wedges of the two outside assemblies tapering in the opposite direction and away from each other.

9. In a crawler frame to base frame connection as defined in claim 1, and said power means including a screw-threaded pulling element for said wedge having a threaded connection therewith and being adapted to be turned by a wrench, and means on one connector plate engaging the screw-threaded pulling element and resisting axial movement thereof in one direction.

10. In a crawler frame to base frame connection as defined in claim 1, and said power means comprising a double-acting power cylinder connected to the wedge for moving the wedge in opposite directions on its wedging axis.

11. In a crawler frame to base frame connection as defined in claim 10, and said power cylinder being bodily attached to one of the connector plates of said one frame.

12. In a crawler frame to base frame connection as defined in claim 10, and the power cylinder being connected between said wedge and one frame.

13. A crawler frame to base frame connection for cranes and the like comprising plural spaced connector assemblies for said frames along the length of the crawler frame, each connector assembly comprising three closely adjacent parallel plates two of which are attached to one frame and one of which is attached to the other frame, said two plates being disposed on opposite sides of said one plate, said two plates near corresponding ends having registering polygonal openings formed therethrough, said one plate near the same end thereof having a V-notch formed therein with divergent edges of the V-notch being parallel to corresponding edges of said polygonal openings, a matching polygonal cross-section locking wedge for said plates, said wedge tapering in one direction, said divergent edges of the V-notch being chamfered at an angle matching the taper of said wedge, means on said connector assembly supporting said wedge in alignment with said polygonal openings with the forward tip of the wedge partially engaged in one of said openings, and means on said connector assembly operable to move the wedge on its wedging axis into full locking engagement with said polygonal openings and said V-notch, and means rigidly interconnecting said two plates at another location on the connector assembly and being movably engaged with said one plate.

14. A crawler frame to base frame connection for cranes and the like as defined in claim 13, and said last-named means comprising a straight polygonal cross-section pin held in matching polygonal cross-section openings of said two plates and extending through a V-notch of said one plate having divergent edges which are parallel to corresponding edges of the last-named polygonal openings.

15. A crawler frame to base frame connection for cranes and the like as defined in claim 13, and said means on said connector assembly operable to move the wedge including a wedge pulling member connected to the wedge threadedly, means to turn the wedge pulling member, and means to resist axial movement of the wedge pulling member in one direction during its turning.

16. A crawler frame to base frame connection for cranes and the like as defined in claim 13, and said means on said connector assembly operable to move the wedge comprising a double-acting power cylinder having a connection with the wedge and being operable to pull the wedge and to push the wedge in an opposite direction on its wedging axis.

17. In a crawler frame to base frame connection, a plurality of connector plates fixed to a crawler frame and base frame and being disposed side-by-side in interfitting parallel relationship, the connector plates fixed to one frame having aligned polygonal through openings and at least a connector plate of the other frame having a V-notch formed therein with divergent edges of the V-notch being in substantial alignment with corresponding edges of the polygonal through openings, a tapered matching polygonal cross-section wedge adapted to be placed in said through openings and notch, said divergent edges of the V-notch being chamfered at an angle matching the tapers of said wedge, power means to move the wedge on its wedging axis to a positive locking position of engagement with said polygonal through openings and said V-notch, and means fixedly connecting said plates of one frame at another location thereon with said plate of the other frame being shiftably disposed relative to said means and plates of said one frame, whereby the wedge in said positive locking position forces said plate of said other frame into rigidly locked engagement with said means.

18. In a crawler frame to base frame connection, a plurality of connector plates fixed to a crawler frame and base frame and being disposed side-by-side in interfitting parallel relationship, the connector plates fixed to one frame having aligned polygonal through openings and at least a connector plate of the other frame having a notch formed therein including substantially right angularly spaced edges in substantial alignment with corresponding edges of the polygonal through openings, a tapered matching polygonal cross-section wedge adapted to be placed in said through openings and notch, said tapered polygonal cross-section wedge having top and bottom opposing pairs of convergent flat faces extending longitudinally of said wedges for engaging corresponding edges of the through openings and notch, power means to move the wedge on its wedging axis to a positive locking position in which the bottom pair of convergent flat faces are in engagement only with the corresponding bottom edges of the polygonal through openings and the top pair of convergent flat faces are in engagement only with the substantially right angularly spaced edges of the notch, and means fixedly connecting said plates of one frame at another location thereon with said plate of the other frame being shiftably disposed relative to said means and plates of said one frame, whereby the wedge in said positive locking position forces said plate of said other frame into rigidly locked engagement with said means.

* * * * *